Feb. 27, 1951   C. A. FLOERKE   2,543,162
MILKING MACHINE
Filed July 14, 1949

Inventor
CARL A. FLOERKE
By Gerald P. Welch
Attorney

Patented Feb. 27, 1951

2,543,162

UNITED STATES PATENT OFFICE 2,543,162

MILKING MACHINE

Carl A. Floerke, Whitewater, Wis.

Application July 14, 1949, Serial No. 104,660

1 Claim. (Cl. 31—58)

This invention relates to improvements in milking machines, and more particularly to a novel milking machine employing the pipe-away system of milking.

An object of the invention is to provide a device of the type which will compensate for the absence of a milk pail in the pipe-away system of milking to prevent upward creeping of the suction cups of the device.

Another object of the invention is to provide a pendulum weight connected with the pulsating means as a compensating medium.

Other and further objects of the invention will appear as the description proceeds, reference being had to the accompanying drawing, in which.

Figure 1:
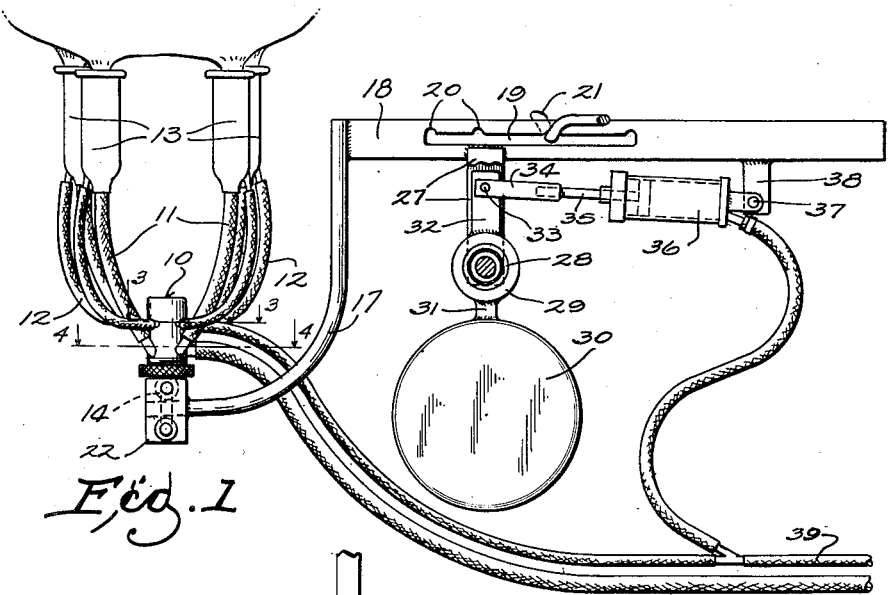
Fig. 1 is a view in side elevation of a milking machine embodying the invention.
Figure 2:
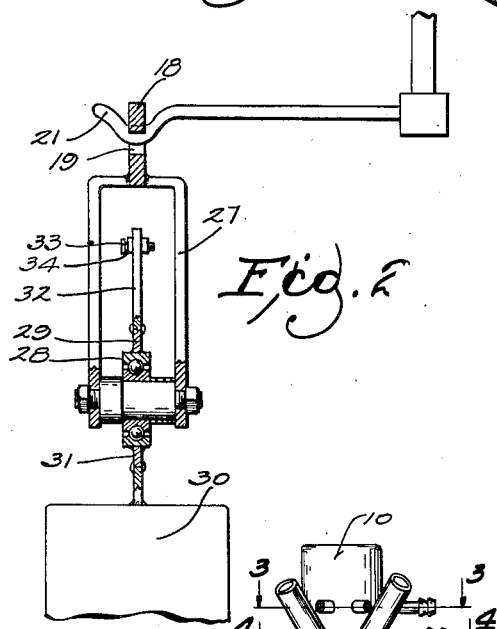
Fig. 2 is a view partly in elevation and partly in section of the pendulum suspension means.
Figure 3:
Fig. 3 is a view on line 3—3 of Fig. 1.
Figure 4:
Fig. 4 is a view on line 4—4 of Fig. 1.
Figure 5:
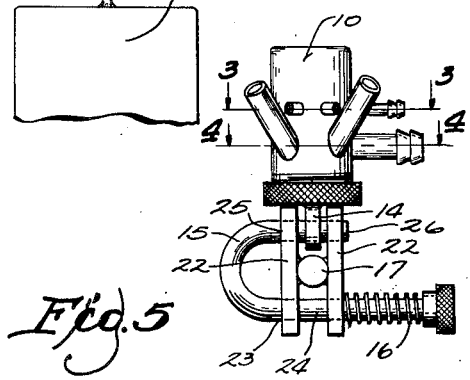
Fig. 5 is a side view in elevation of the spring latch connecting means subjoined to the claw.

Referring more particularly to the drawings, the numeral 10 refers to a milker claw connected by milk tubes 11 and pulsator tubes 12 with the teat cups 13. The milker claw 10 has a subjoined eye 14 adapted to serve as a keeper for the latch 15, normally held in engagement by the coil expansion spring 16. An arcuate claw assembly support arm 17 is fixed at its upper end to the bar 18 which is longitudinally slotted for a portion of its length at 19 with spaced notches 20 marking the upper edge of said slot formation adapted to receive the hanger hook 21. The support arm 17 is provided at its lower end with a pair of vertical rectangular apertured plates 22, the lower apertures at 23 housing the long arm 24 of the latch 15, and the upper apertures at 25 serving to house the short portion 26 of said latch 15. A fixed yoke 27 is subjoined to the bar 18 and holds between its lower ends the ball bearing 28 having a central circular flange 29 supporting a pendulum 30 by means of the intervening arm 31. A lever arm 32 is fixed oppositely to said flange 29 and is pivoted at 33 to the bar 34 fixed to the piston rod 35 of the cylinder 36 pivoted at 37 to the bracket 38 on bar 18.

In use the assembly is pivotally suspended on the hook member 21 and is supported on the other end by the suction of the teat cups 13. The alternate suction and releasing of the teat cups 13 causes an upward and downward movement of the assembly which tends normally to cause an upward creeping of said cups during suction stroke of the cycle. The cylinder 36 is connected to the pulsator line 39 and the suction in said piston withdraws rod 35 and bar 34 to swing the pendulum weight 30 udder-wise thus counteracting the upward creeping of said teat cups. The pull of the weight may be varied by use of the several notches 20 in the slot at 19 of bar 18. The movement of the weight imparts a pull on the teat cups closely resembling the sloshing of the milk in suspended type milker pails. Thus in this system the milk may be piped away without the use of a pail.

It will be understood that the device is capable of many modifications in structure and design, without departing from the spirit of the invention, within the scope of the appended claim.

Having thus described the invention, what is claimed and desired to be secured by Letters Patent of the United States, is:

In a milking machine, a horizontal bar having a horizontal upwardly notched slot adapted for selective engagement with a hanger hook, an arcuate rod extending downwardly and away from said bar, a teat cup claw, means releasably engaging said claw with the lower end of said rod, a downwardly disposed yoke fixed to said bar, a bearing in said yoke, a pendulum swingably held on said bearing, a lever positively connected with said pendulum disposed above said bearing, a cylinder pivotally held horizontally under said bar, a piston in said cylinder connected with said lever, vacuum tubes connected with said teat cup claw, and means connecting said tubes with said cylinder to move the pendulum.

CARL A. FLOERKE.

REFERENCES CITED

The following references are of record in the file of this patent:

UNITED STATES PATENTS

| Number | Name | Date |
|---|---|---|
| 1,408,326 | Wilmotte | Feb. 28, 1922 |
| 1,859,213 | McCornack | May 17, 1932 |
| 1,859,214 | McCornack | May 17, 1932 |
| 2,483,516 | Babson | Oct. 4, 1949 |